3,071,083
MONOCABLE AERIAL ROPEWAY
Sepp Hochmuth, Niederau-Wildschenau, Austria
Filed Sept. 19, 1960, Ser. No. 56,793
Claims priority, application Switzerland Sept. 21, 1959
4 Claims. (Cl. 104—178)

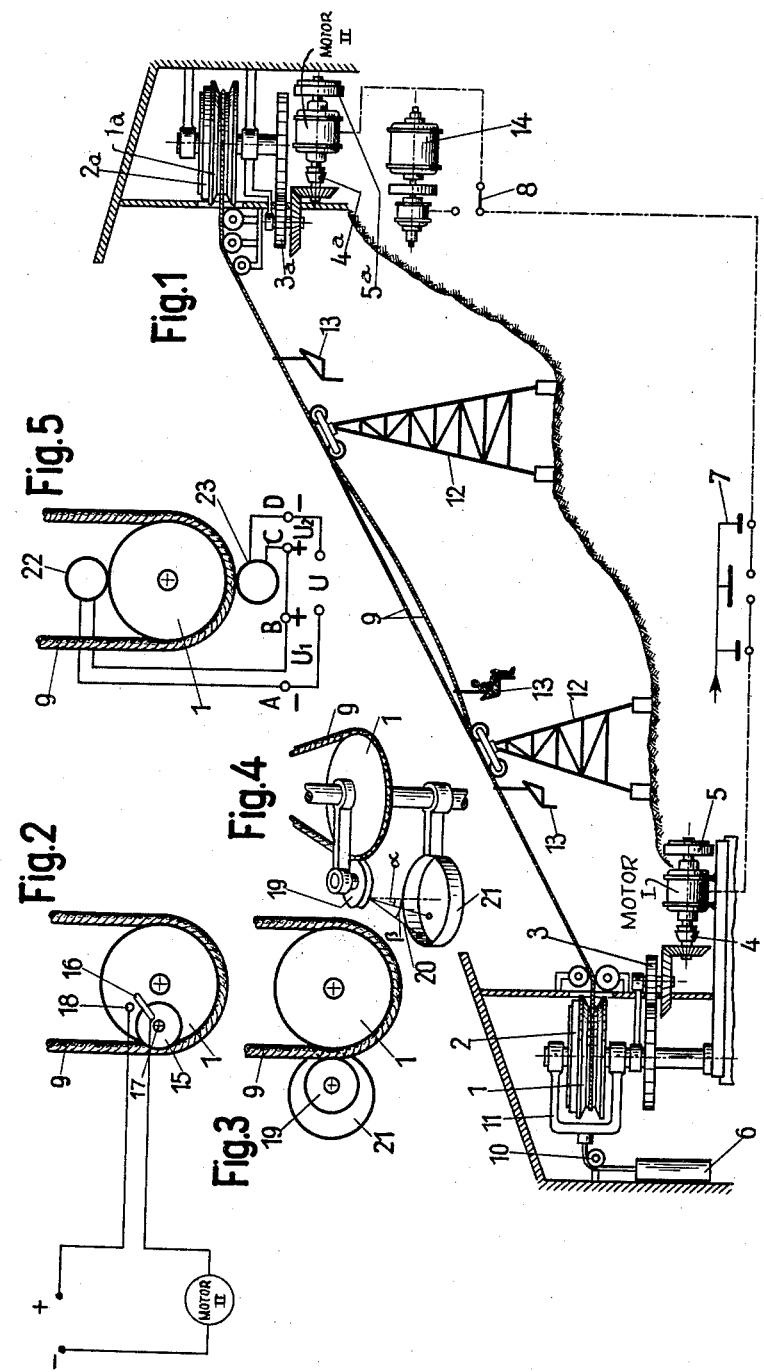

The present invention relates to monocable aerial ropeways of the type having an endless cable and a rotary drive for the cable.

The use of aerial cableways is increasing, since this form of transport is relatively inexpensive. Moreover, it is in many cases the only available way for opening otherwise inaccessible regions to traffic.

Chair-lifts are an example of a monocable aerial ropeway which are very popular as they are able to convey a large number of people at a minimum cost. In particular it should be noted that the chair of the lift is not enclosed, thereby avoiding the necessity and consequent cost of an enclosure. Chair-lifts generally accommodate single chairs or two-seaters and the seats hang directly on an endless cable driven by an electromotor.

Such a rotary drive for a cable of the above device has, however, a drawback in that it is not adaptable to the variations in weight of the load, so that the motor must operate at full power even though only a few persons are transported. The cable passes around a pair of grooved pulleys, one of which is driven, whereby the cable is driven in a closed loop path having parallel reaches moving in opposite directions. The driving of the motor at full power, regardless of the magnitude of the load on the device, is a serious deficiency in transporting persons in absolute safety, since overload, low friction due to lubricants, or ice formation on the cable may cause the cable to slip in the groove of the drive pulley, resulting in accidents.

It is a principal object of the invention to avoid the deficiencies in the prior art devices and to provide a cableway which is perfectly safe in operation. As a remedy to the disadvantages in the prior art devices it is proposed according to the invention to provide at each of the end stations at which the grooved pulleys are located separate power supplies which can be operated either individually or simultaneously. Hence the electromotors of the power supplies can be selectively energized. In general, the cable runs between end stations which are at different elevations, and the station at the higher elevation will be conveniently referred to as the mountain station while the station at the lower elevation will be referred to as the valley station. By virtue of the separate power supplies at each of the end stations it becomes possible, in accordance with the invention, to provide regulating means such as thyratrons for controlling power supplies according to the magnitude of the load to be transported.

An advantage offered by the present invention in providing a power supply and control therefor at the mountain station is that the loads of the opposite reaches of the cable are balanced. If there is only one power supply, for example, at the valley station and if a great number of persons or heavy loads are transported, the hauling portion of the cable, i.e. one of the reaches of the cable, will be highly stretched and taut, while the carrying portion or other reach of the cable will be relaxed so as to sag between the loads on the cable. The consequence thereof may be that the cable slips out of the guides in the pulleys to cause an accident.

The arrangement according to the invention eliminates the above disadvantage in that in cases where heavy loads are to be transported, the mountain station motor can be actuated to reduce the tension in the hauling portion of the cable and to increase the tension in the carrying portion to thereby avoid sagging of the carrying portion. This permits varying the size of the load while maintaining approximately equal tensile stresses in both reaches of the cable.

One embodiment of the invention in which there are various types of automatic control of the power supplies will now be described by way of example with reference to the accompanying drawings wherein:

FIG. 1 is a diagrammatic view of the device according to the invention; and

FIGS. 2–5 show in detail various types of control means.

The end stations of the aerial cable device hereinafter described as the mountain station and the valley station each are provided with a separate power supply, which power supplies are preferably of equal rating. The lower supply may be a motor I, II, such as an electromotor, a diesel motor or some other rotary drive. The motors I, II are each adapted to respectively, continuously drive grooved pulleys 1, 1a through couplings 4, 4a and gear 3, 3a. There are provided main brakes 2, 2a on the pulleys and a brake 5, 5a on the transmission shafts. A cable 9 is tensioned in known way by the counterweight 6 connected over the roll 10 to the movable support 11 of pulley 1. The magnitude of the tension in the cable 9 controls the sag of the cable between the masts due to the load 13. In addition to the motor of the power supply there is provided an emergency dynamo 14 adapted for use in the event of interruptions of current or of any other service difficulties that may occur in the power supply.

It is obvious that the existence of a double driving arrangement, one motor at the valley station and a second motor at the mountain station, offers important advantages. If the traffic diminishes, one motor only is operated and the operating expenses are reduced. The motors can be used alternately, in which case they will have an extended service life. As the load approaches a maximum, the second motor is operated. The energization of the second motor causes the introduction of a torque which is to be at the second grooved pulley contrasted with the increasing of the drive at one pulley in the single pulley drive devices, thus eliminating the risk of slippage of the cable even from a heavy load, ice formation on the cable or disturbance due to the lubricant.

Consequently, in the device according to the invention, the tension in the reaches of the cable are equal whereas in the single pulley drive devices only one reach is substantially stressed and the other is relaxed. This exposes the single pulley drive devices to the risks of slippage of the cable due to the high stress. This is of particular importance since the cable device according to the invention may be used in cold climates where ice and snow on the cable lowers the coefficient of friction thereof and the use of excessive tension in the cable may result in slippage thereof. Similarly, the cables are of necessity lubricated and if excessive stress is provided in the cable, then the cable will slip on the pulleys.

Another important advantage of the arrangement in accordance with the invention is that service must not necessarily be interrupted if one of the drive devices is out of service, since the other drive device may be operated. Service of the motor associated with the defective part can be switched off and the other motor operated.

According to the invention it is possible, by operating the selector switch 7, to selectively energizes the motor I or the motor II, or to energize both motors simultaneously. In the event of an interruption of current, the emergency dynamo is connected to the pulley to constitute the driving source to keep the installation in service. This is obtained by moving switch 8 to the appropriate position.

The invention also provides an automatic control of the power supplies by use of known means (such as thyratrons, ignitrons and the like) which regulate the energization of the second motor in relation with the magnitude of the energization on the cable load.

Safety is increased by the automatic energization of the second motor when relative movement of the cable 9 in the grooved pulley is automatically detected. FIGS. 2–5 show various types of control means capable of effecting the above operation. In FIGS. 2–5 the control means is shown associated with pulley 1 for controlling the operation of motor II. Obviously, the control means may be associated with pulley 2a for controlling motor I if desired.

A roll 15 supporting a finger 16 is rotatably mounted at the periphery of the grooved pulley 1 so as to project beyond the circumference of said pulley. As long as the friction between the cable 9 and the groove pulley 1 remains normal, the roll 15 remains fixed on its axis 17. Thus, roll 15 is supported on pulley 1 for rotation about axis 17. The cable 9 drives pulley 1 and roll 15 such that when no slippage between pulley 1 and cable 9 exists, roll 15 and pulley 1 have no relative movement. If the cable 9 starts slipping on pulley 1, i.e. if the angular velocity of the cable increases with respect to the angular velocity at the circumference of the pulley 1, the roll 15 rotates relative to the pulley 1 and the necessary synchronized movement of the periphery of roll 15 and the periphery of pulley 1 is upset and finger 16 contacts lug 18. The contact of finger 16 with lug 18 may be associated with the motor II on the other pulley to energize the same. This may be accomplished in conventional manner, wherein finger 16 and lug 18 constitute a switch for coupling an energy source to the motor II on the other pulley.

FIGS. 3 and 4 show another embodiment of the controlling device in accordance with the invention. FIG. 3 is a top view of the device represented diagrammatically in FIG. 4. The cable 9 runs between the grooved pulley 1 and roll 19. A pendulum 20 is suspended from the roll 19 in freely oscillatable fashion such that the pendulum 20 assumes an angular position with respect to the roll 19. The roll rotates about the axis of rotation thereof. When the roll 19 rotates at normal angular velocity the pendulum is at an angle α with respect to the roll 19. If the velocity of the roll 19 exceeds the normal velocity, the angle α between the pendulum and the roll 19 increases. If the angle reaches an angle β the pendulum contacts the contact ring 21 which may be adapted to close a circuit, thereby switching on the second motor in a manner as shown in FIG. 2.

FIG. 5 is a schematic view of still another embodiment. Two rolls 22 and 23 of identical diameter are in contact, one with cable 9, the other with the grooved pulley 1. Each roll is connected to a small dynamo (not shown). The current of the dynamo associated with roll 22 leads to taps A, B, while the current of the dynamo associated with roll 23 leads to taps C, D. The taps are coupled so that the dynamos oppose one another and when the peripheral speed of the pulley is the same as the speed of the cable 9, i.e. no slippage, a zero voltage will be indicated at U. If the speed of rotation of the roll 23 in contact with the cable 9 is increased due to an increase of the relative velocity of cable 9 with respect to the circumference of the grooved pulley 1, a voltage will be generated at U, which voltage can be utilized for controlling the energization of motor II of pulley 2a by means of regulating devices of known type such as thyratrons, ignitrons and the like.

The control system in accordance with the invention furnishes complete safety against slippage of the cable, as the second motor is immediately switched on automatically as soon as slippage is detected. It is thus ascertained that the present invention supplies advantages from an economical point of view as well as with regard to the safety of transported persons and goods.

While illustrative embodiments of the inventive idea have been described herein in detail, it will be understood that the scope of the invention is not limited to such embodiments or otherwise than by the terms of the appended claims.

What I claim is:

1. A driving system for a cable way of the type having a movable endless line adapted to support and transport a load, the line extending between first and second stations, the driving system comprising means at each of said stations engaging said line in driving engagement to define a closed path therefor constituted by parallel reaches running in opposite directions, the line sagging under the influence of the load, means coupled to each of the first said means for driving the same to impart a drive to said line thereat, and control means coupled to the latter said means for selectively energizing the same in response to relative slippage between the line and the first said means at the stations whereby the line may be selectively driven at either of said stations and simultaneously at both said stations.

2. A driving system for a cable way of the type having an endless line adapted to support a load, the line extending between first and second stations, the driving system comprising a pulley at each of said stations, the line passing around the pulleys to form a continuous closed loop path for the line constituted by parallel reaches running in opposite directions, one of the reaches constituting a hauling line and the other reach constituting a return line, the load being adapted to be supported on the hauling line, drive means coupled to each of said pulleys for driving the same, the hauling line sagging under the influence of the load, said line normally being in frictionally engagement with said pulleys to pass therearound without slipping, and control means normally energizing the drive means associated with one of said pulleys and adapted for selectively energizing the drive means associated with the other of said pulleys in response to slipping of said line around said pulleys whereby the line can be driven simultaneously at both said stations.

3. A driving system as claimed in claim 2 wherein said control means comprises a roll rotatably supported on one of said pulleys, said line engaging said roll and said associated pulley to cause rotation thereof about respective axis of rotation such that the relative position of said roll with respect to said pulley is unchanged when slippage is absent between said line and the roll and pulley respectively, a finger extending from said roll, and a lug on said one pulley and normally spaced from said finger, said roll rotating with respect to said pulley in response to slippage between said line and said pulley to engage said lug, and energize the drive means associated with the other of said pulleys.

4. A driving system as claimed in claim 2 comprising a roll engaging said one pulley at the periphery thereof, a second roll engaging the line around said one pulley, means operatively associated with each of said rolls to generate a voltage in response to the speed of rotation thereof, the last said means associated with each roll being connected in opposing relation to normally cancel said voltages, said voltages producing a difference when the line slips with respect to said one pulley and means responsive to the difference between said voltages to energize the drive means associated with the other of said pulleys.

References Cited in the file of this patent

UNITED STATES PATENTS

| | | |
|---|---|---|
| 1,294,813 | Lammert et al. | Feb. 18, 1919 |
| 2,057,173 | Waalkes | Oct. 13, 1936 |

FOREIGN PATENTS

| | | |
|---|---|---|
| 1,070,763 | France | Feb. 24, 1954 |